(12) United States Patent
Sato et al.

(10) Patent No.: US 6,963,746 B2
(45) Date of Patent: Nov. 8, 2005

(54) RADIO BASE STATION TRANSCEIVER SUB-SYSTEM

(75) Inventors: Tadahiro Sato, Kawasaki (JP); Tomomitsu Yamanobe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 415 days.

(21) Appl. No.: 09/972,671

(22) Filed: Oct. 5, 2001

(65) Prior Publication Data

US 2003/0069042 A1 Apr. 10, 2003

(30) Foreign Application Priority Data

Jun. 27, 2001 (JP) ........................... 2001-194615

(51) Int. Cl.⁷ .................................................. H04Q 7/20
(52) U.S. Cl. .................... 455/450; 455/561; 455/453; 370/431
(58) Field of Search ................................ 455/450, 561, 455/453, 452.1, 562.1, 463, 464, 465, 466, 452.2, 560; 370/335, 341, 431, 437

(56) References Cited

U.S. PATENT DOCUMENTS

| | | | | |
|---|---|---|---|---|
| 5,077,828 A | * | 12/1991 | Waldroup | ................... 455/514 |
| 5,390,366 A | * | 2/1995 | Kasugai | ...................... 455/524 |
| 5,666,655 A | * | 9/1997 | Ishikawa et al. | ............ 455/512 |
| 5,697,059 A | * | 12/1997 | Carney | ....................... 455/509 |
| 6,112,092 A | * | 8/2000 | Benveniste | ................. 455/450 |
| 6,188,915 B1 | * | 2/2001 | Martin et al. | ............. 455/562.1 |
| 6,317,423 B1 | * | 11/2001 | Jantti et al. | .................. 370/347 |
| 6,400,966 B1 | * | 6/2002 | Andersson et al. | ......... 455/561 |
| 6,556,814 B1 | * | 4/2003 | Klomsdorf et al. | ......... 455/121 |
| 6,574,476 B1 | * | 6/2003 | Williams | ................. 455/452.1 |
| 6,625,137 B1 | * | 9/2003 | Kang | ......................... 370/338 |
| 6,658,235 B1 | * | 12/2003 | Tolmunen et al. | ....... 455/67.13 |
| 6,697,604 B1 | * | 2/2004 | Rimpela et al. | ......... 455/67.14 |
| 2002/0102985 A1 | * | 8/2002 | Amalfitano et al. | ........ 455/453 |
| 2002/0187753 A1 | * | 12/2002 | Kim et al. | .................... 455/69 |
| 2003/0072281 A1 | * | 4/2003 | Hirata | ........................ 370/335 |

FOREIGN PATENT DOCUMENTS

| | | |
|---|---|---|
| JP | 06053903 | 2/1994 |
| JP | 11234738 | 8/1999 |

* cited by examiner

*Primary Examiner*—Cong Van Tran
(74) *Attorney, Agent, or Firm*—Katten Muchin Rosenman LLP

(57) ABSTRACT

In a radio base station transceiver sub-system including a radio block, a plurality of base band processing blocks, and a channel allocation control block, the channel allocation control block calculates, for each base band signal processing block, the processing load, converted to a weight value, of all the channels allocated thereto or the ratio of said processing load and processing capability, converted to a weight value, of the base band signal processing block and allocates the traffic channel or the control channel to a base band signal processing block where the processing load or the ratio is small.

7 Claims, 6 Drawing Sheets

RADIO BASE STATION TRANSCEIVER SUB-SYSTEM

BACKGROUND OF THE INVENTION

1. Field of the Invention

The present invention relates to a radio base station transceiver sub-system which communicates with a mobile station by radio, and more particularly to a radio base station transceiver sub-system which distributes and allocates control channels and traffic channels to a plurality of base band signal processing blocks.

2. Description of the Related Art

As shown in FIG. 5, a radio base station transceiver sub-system (BTS) which communicates with a mobile station by radio comprises an amplifier block $1a$, radio block $1b$, base band signal processing blocks $1c_1$–$1c_n$ which process base band signals for a plurality of channels respectively, control block $1d$, and an interface block $1e$ with a base station controller (BSC) 3.

The amplifier block $1a$ amplifies transmission/receive signals, and the radio block $1b$ converts frequencies from high frequency signals, which are input from an antenna via the amplifier block $1a$, to base band signals, and converts the base band signals to high frequency signals and inputs the high frequency signals to the antenna via the amplifier block $1a$. The base band signal processing blocks $1c_1$–$1c_n$ perform such processing as spread- and orthogonal modulation to a plurality of channels of communication signals (e.g. various control signals, voice signals) and inputs the modulated signals to the radio block $1b$, and performs such processing as orthogonal detection, despread modulation and data demodulation to a plurality of channels of communication signals which are input from the radio block, and inputs the demodulated data to the interface block $1e$. The interface block $1e$ performs signal multiple processing, signal separation processing and signal conversion processing between the base station transceiver sub-system (BTS)/base station controller (BSC). The control block $1d$ performs various controls, including call control, traffic channel setting control and transmission power management control.

A 20 msec frame of the traffic channel is divided into 16 radio frame offsets with an 1.25 msec interval, and the base band signal processing blocks $1c_1$–$1c_n$ execute signal processing of the traffic channels which are allocated in each radio frame offset unit. In each radio frame offset, the number of channels for which the base band signal processing block can process is limited. Therefore when a new traffic channel is allocated to a base band signal processing block, a base band signal processing block to which a traffic channel is allocated must be selected considering the load (number of channels) in the radio frame offset of each base band signal processing block.

Also as FIG. 6 shows, a radio zone ZN exists with the base station transceiver sub-system 1 as the center, wherein the radio zone is divided in a plurality of service areas (sector A, sector B, sector C), directional antennas $1a_1$, $1a_2$ and $1a_3$ are disposed in each sector respectively, and the base station transceiver sub-system 1 transmits/receives radio signals to/from the mobile stations $2a$, $2b$ or $2c$ in the sector via the antenna.

In this way, the base station transceiver sub-system (BTS) 1 has a plurality of base band signal processing blocks $1c_1$–$1c_n$ for radio channels, and sets a control channel required for each sector using these base band signal processing blocks. To start the operation in sector units using the radio base station transceiver sub-system (BTS) 1, at least the following four control channels must be set for each sector.

(1) Pilot channel
(2) Sync channel
(3) Paging channel (downward control channel for paging/broadcasting information transmission)
(4) Access channel (upward control channel for transmitting call originating message or call incoming response messages from radio subscriber terminal)

In the paging channel and access channel, a plurality of channels can be set for each sector. How many control channels are set in a sector and which base band signal processing block handles each control channel are designated fixedly in advance by BTS operation data (station operation data).

Therefore conventionally control channels are set in each sector based on the station operation data, and the control channels of each sector are allocated to a predetermined base band signal.

Also the number of channels allocated to each base band signal processing block is monitored so that a new traffic channel and a control channel are allocated to a base band signal processing block which has few allocated channels.

When a base station transceiver sub-system (BTS) is opened, the available number of base band signal processing blocks may be low when the number of base band signal processing blocks disposed is low or is subject to a system failure. In such a case, it is judged whether decreasing the number of paging channels/access channels being set is necessary, and if not, it is necessary to cancel the allocation of control channels which are allocated to the base band signal processing block which cannot process, and to reallocate them to another base band signal processing block. If it is necessary to decrease, the number of control channels being set for each sector must be decreased and base band signal processing blocks must be reallocated.

Conventionally, however, a sector to which a control channel is allocated, the number of channels allocated, and a base band signal processing block to which a control channel of a sector is allocated, are designated fixedly by the station operation data of the base station transceiver sub-system. Therefore when the number of base band signal processing blocks is low at the opening of the base station transceiver sub-system (BTS), or when the number of available base band signal processing blocks is low due to a system failure, there is a case where the number of allocated control channels is decreased more than necessary, and the control channels are allocated to the base band signal processing blocks more than the processing capability.

Also when a traffic channel is allocated, a channel allocation position must be selected so that allocation does not concentrate to a same radio frame offset of a same base band signal processing block, in order to distribute the load of the base band signal processing blocks, and to decrease call loss probability. Conventionally, however, allocation was performed only under the conditions of a radio frame offset for each base band signal processing block without considering accurate load distribution.

The processing load of an individual channel constituting a control channel is different, and the processing load of a traffic channel is also different depending on the transmission rate. Conventionally a new traffic channel and a control channel are allocated simply to satisfy the conditions of a radio frame offset, without considering the processing load for each channel. Therefore if channels with a large load concentrate to a predetermined radio frame offset of one base band signal processing block, load in the radio frame offset increases, where processing capability is exceeded, call loss is generated, and call loss probability increases. To decrease call loss, hand off to another base station while a call is continuing must be possible. To enable a hand off, a base station which originated the hand off and a base station after a hand off must use a same radio frame offset. Therefore it is necessary to evenly distribute load to each base band signal processing block and to each radio frame offset considering the processing load of each channel.

SUMMARY OF THE INVENTION

It is an object of the present invention to judge whether it is necessary to decrease the number of control channels to be set when the number of base band signal processing blocks disposed is small or when the number of available base band signal processing blocks decreases due to a system failure, so as to set an appropriate number of control channels in each service area such as sector.

It is another object of the present invention to reallocate the control channels which have been allocated to a base band signal processing block which is not disposed, or cannot be used due to a system failure, to another available base band signal processing block so that the processing capability thereof is not exceeded, and load is distributed when the number of base band signal processing blocks disposed is low or when the number of available base band signal processing blocks decreases due to a system failure.

It is still another object of the present invention to dynamically allocate a new traffic channel and a control channel to base band signal processing blocks considering the processing load of each channel so that the load of each base band signal processing block is accurately distributed.

It is still another object of the present invention to distribute the allocation of channels to a plurality of operating base band signal processing blocks so as to make the load of each base band signal processing block even, in order to prevent an overload state of a specific base band signal processing block, to improve the stable operation of the base band signal processing blocks, and to decrease a system shutdown at the failure of a base band signal processing block.

First Invention

In the first invention, a channel allocation control block decides the type and the number of control channels to be allocated to each service area based on the processing capability of all the available base band signal processing blocks, the number of the base band signal processing blocks disposed, and the processing load of the control channels, and allocates the control channels to each service area. Specifically, when a weight value is defined in conformity with the processing load of an individual channel constituting traffic channels and control channels, the channel allocation control block judges whether it is possible to allocate the control channels specified by a station operation data to each service area based on the processing capability, converted to a weight value, of all the available base band signal processing blocks and the processing load, converted to a weight value, of the control channels which are set in all the service areas, and if possible, allocates the processing of the control channels to each base band signal processing block in accordance with the station operation data.

When the number of disposed base band signal processing blocks and the number of available base band signal processing blocks is low due to a system failure, the processing of the control channels cannot be allocated to each base band signal processing block in accordance with the station operation data. In such a case, the channel allocation control block calculates, for each base band signal processing block the processing load, converted to a weight value, of all the channels allocated thereto, or the ratio of said processing load, and the processing capability, converted to a weight value, of the base band signal processing block, and allocates the control channels which are allocated to a base band signal processing block which cannot process to a base band signal processing block where the processing load or the ratio is small.

If it is not possible to set the control channels which are specified by the station operation data, to each service area, the channel allocation control block judges whether it is possible to allocate control channels with a minimum configuration to each service area based on the processing capability, converted to a weight value, of all the available base band signal processing blocks and the processing load, converted to a weight value, of all the control channels with a minimum configuration to be allocated to each service area, and if possible, the channel allocation control block allocates the processing of the control channels with a minimum configuration to each base band signal processing block.

According to the first invention, it can be correctly judged whether it is necessary to decrease the number of control channels to be set, and an appropriate number of control channels can be set for each service area such as sector when the number of disposed base band signal processing blocks is low, or when the number of available base band signal processing blocks is low due to a system failure. In other words, if decreasing the number of control channels is unnecessary, the control channels are allocated to each service area inconformity with the station operation data, and execution of processing of the control channels can be allocated to each base band signal processing block. If decreasing is necessary, it is correctly judged whether setting the control channels with a minimum configuration to each service area is possible, and if possible, execution of processing of the control channels with a minimum configuration can be allocated to a base band signal block, and if not possible, all service areas can be closed.

When the number of disposed base band signal processing blocks is low or when the number of available base band signal processing blocks is low due to a system failure, the control channels allocated to a base band signal processing block, which are not disposed or cannot be used due to a system failure, can be reallocated to another available base band signal processing block such that the processing capability thereof is not exceeded and load is distributed.

Also by unifying the channel allocation for each base band signal processing block, it is prevented from overloading a specific base band signal processing block. Also by evenly distributing the processing load of each base band signal processing block, operation of the base band signal processing block can be more stable. Also by distributing the accommodation of control channels required for service operation to a plurality of base band signal processing blocks, a system shutdown during failure of a base band signal processing block can be minimized.

Second Invention

In the second invention, when a new traffic channel or a new control channel is allocated to a base band signal processing block, the channel allocation control block calculates the processing load, converted to a weight value, of all the channels allocated to each base band signal processing block, or the ratio between this processing load and the processing capability, converted to a weight value, of the base band signal processing block, and allocates the traffic channel or the control channel to a base band signal processing block where the processing load or the ratio is small.

According to the second invention, a new traffic channel and a control channel can be dynamically allocated to the base band signal processing blocks considering the processing load of each channel so that the loads of each base band signal processing block are distributed, and allocating channels exceeding the processing capability can be prevented and therefore call loss probability decreases.

Since the channel allocation to base band signal processing blocks is distributed so that the load of each base band signal processing block is even, an overload of a specific base band signal processing block can be prevented, operation of the base band signal processing blocks can be more stable, and a system shutdown during failure of the base band signal blocks can be minimized.

Other features and advantages of the present invention will be apparent from the following descriptions explained in conjunction with the accompanying drawings.

Figure 1:
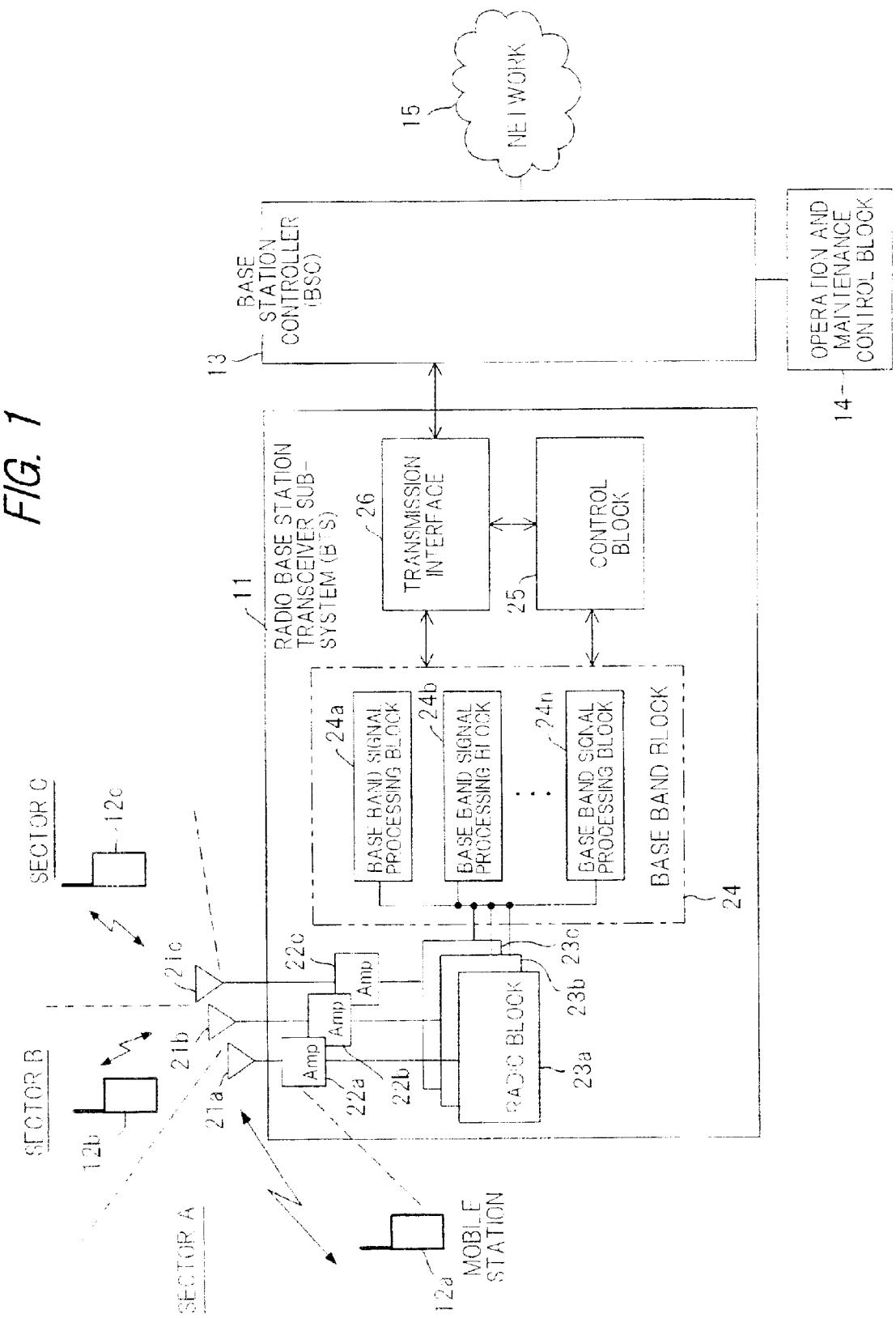
FIG. 1 is a block diagram depicting the entire mobile radio system, including the radio base station transceiver sub-system of the present invention.

DESCRIPTION OF THE PREFERRED EMBODIMENTS (A) Overview of the Invention

When channels (traffic channels, control channels) are allocated to the base band signal processing blocks so that load is distributed evenly, a simple conventional method which considers only the number of channels accommodated in the base band signal processing blocks cannot distribute load evenly. This is because the processing load of the base band signal processing blocks to be applied for the operation of the channel differs depending on the type of the control channel and the communication rate of the traffic channel.

In the present invention, a weight value is defined in conformity with the processing load of the traffic channel and the control channel, paying attention to the fact that the processing load differs depending on the type of each control channel and the communication rate of the traffic channel. By this, the total processing load of all channels allocated to each base band signal processing block (total weight) is calculated, a base band signal processing block which total weight is the lowest is selected from the plurality of base band signal processing blocks when a new channel is allocated, and the new channel is allocated to it. In this way, the processing load can be distributed evenly to the base band signal processing blocks.

At least four control channels (1) Pilot channel, (2) Sync channel, (3) Paging channel and (4) Access channel, must be set for each sector. Of these, for the paging channel and access channel, a plurality of channels can be set for each sector, and the number of each control channels to be set for each sector and a base band signal processing block to which a control channel is allocated are specified in advance by BTS operation data (station operation data). However, in some cases control channels may not be set as specified by the station operation data depending on the processing capability of the base band signal processing blocks, number of disposed base band signal processing blocks, and the processing load of the control channels. In the present invention, it is accurately judged when the control channels cannot be set as specified by the station operation data, and in such a case the control channels are set with a minimum configuration to make the service of BTS possible in sector units.

The actual load status in each radio frame offset is the condition to select a base band signal processing block to which a new traffic channel is allocated. In other words, the sum of the weight values of control channels and traffic channels currently accommodated in a designated radio frame offset of each base band signal processing block, is calculated respectively, a base band signal processing block with the lowest load is selected, and a new traffic channel is allocated to the selected base band signal processing block. It is an essential condition that the specified radio frame offset have an vacancy, and this aspect is not mentioned hereafter.

(B) Configuration of Radio Base Station Controller

Figure 6:
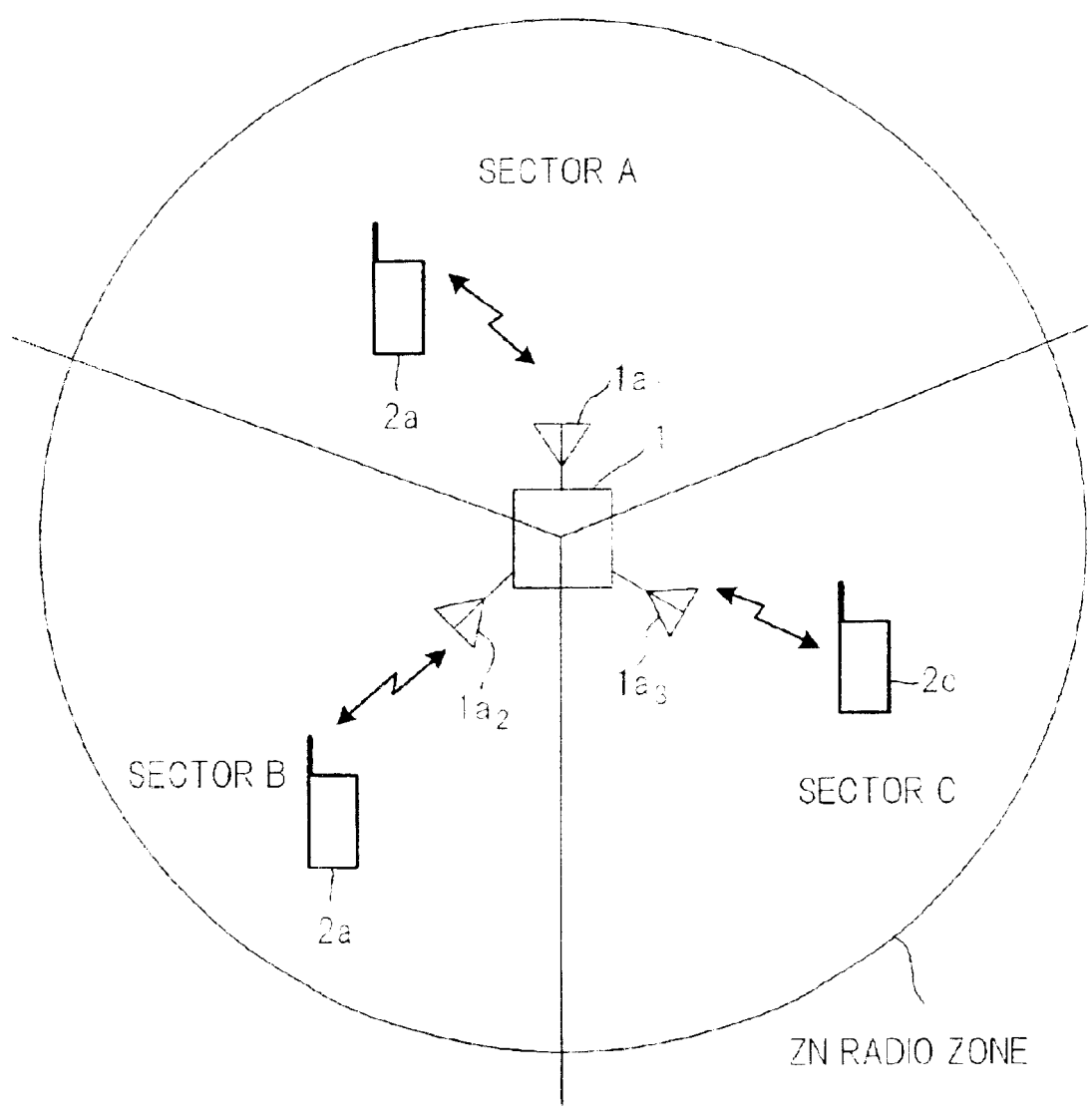
FIG. 6 is a diagram depicting the sectors (service areas).

FIG. 1 is a block diagram depicting the entire mobile radio system including the radio base station transceiver sub-system of the present invention, where 11 is a radio base station transceiver sub-system (BTS) which communicates with a mobile station by radio, 12a–12c are mobile stations (portable telephone terminals), 13 is a base station controller (BSC), 14 is a operation and maintenance control block which is connected to the base station controller and inputs station operation data, and 15 is a network, such as a public network. The radio zones with the radio base station transceiver sub-system 11 as the center is divided into three sectors, A–C, as shown in FIG. 6, and the mobile stations 12a–12c exist in each sector.

The radio base station transceiver sub-system 11 has directional antennas 21a–21c, amplifier blocks 22a–22c, and radio blocks 23a–23c for each sector. The radio base station transceiver sub-system 11 also has a base band block 24 for performing base band signal processing, a controller 25 in the base station for controlling channel allocation, and a transmission interface block 26.

The amplifier blocks 21a–21c amplify transmission/receive signals, the radio blocks 22a–22c convert frequencies from high frequency signals, which is input from the antenna via the amplifier blocks 21a–21c, to base band signals, or converts the base band signals to high frequency signals, and inputs to the antennas via the amplifier blocks 21a–21c. The base band block 24 has a plurality of base band signal processing blocks 24a–24n, each of which performs such processing as spread- and orthogonal-modulation on communication signals (various control signals, voice signals, data signals) for a plurality of channels respectively, and inputs the modulated signals to the radio blocks 23a–23c, or performs such processing as orthogonal detection, despread modulation and data demodulation on the communication signals for a plurality of channels which are input from the radio blocks 23a–23c, and inputs the demodulated data to the interface block 26. The interface block 26 performs signal multiplex and signal separation processing and signal conversion processing between the base station transceiver sub-system (BTS)/base station controller (BSC). The control block 25 performs various controls, such as call control and transmission power management control, and performs the later mentioned channel allocation control related to the present invention. The BTS operation data required for channel allocation control is set by the operation and maintenance control block 14, and is input to the control block 25 by the base station controller 13 via the transmission interface 26.

(C) Comparison of Allocation Control Between Prior Art and Present Invention

This section describes the differences of the allocation control methods when the weight value is not used according to prior art, and when the weight value is used according to the present invention.

(a) Channel Allocation Example When Weight Value is not Used (Prior Art)

The prerequisites are:

① The number of disposed base band signal processing blocks is 3, which are denoted by BB#1–BB#3, ② the maximum number of channels that can be accommodated per base band signal processing block is 10, and ③ the control channels have been allocated to each base band signal processing block BB#1–BB#3 as shown in Table 1.

TABLE 1

| BB #1 | BB #2 | BB #3 |
|---|---|---|
| Pilot #1 | Paging #1 | Pilot #2 |
| Sync #1 | Paging #2 | Sync #2 |
|  | Paging #3 | Pilot #3 |
|  | Access #1 | Sync #3 |
|  | Access #2 | Access #3 |

In other words, the total number of allocated control channels of each block is BB#1=2, BB#2=5 and BB#3=5.

Under the above conditions, and when the maximum number of channels that can be accommodated by one base band signal processing block is 10, the number of channels which can be accommodated in each base band signal block BB#1–BB#3 is BB#1=2/10, BB#2=5/10 and BB#3=5/10.

To accommodate six traffic channels here, four channels are allocated to BB#1, 1 channel to BB#2 and 1 channel to BB#3, so that the number of channels allocated to each base band signal processing block is even. As a result, when the maximum number of channels that can be accommodated is 10, the number of channels accommodated in each base band signal processing block BB#1–BB#3 is BB#1=6/10, BB#2=6/10 and BB#3=6/10. However, the difference of the processing load to be applied to the base band signal processing blocks according to the type of each control channel is considered, and the number of channels accommodated in each base band signal processing block is converted to BB#1=6/10, BB#2=11/10 and BB#3=7/10. Here the processing load of each control channel is pilot channel=1, sync channel=1, paging channel=2, and access channel=2 when the processing load of a 9.6 kbps traffic channel is 1. This factor is referred to as the "weight value" of a channel.

If a traffic channel is added so that the number of allocated channels is even, as in prior art, that is, if a base band signal processing block is selected without considering the weight value of a control channel and traffic channel, then the processing load exceeds the processing capability as seen in the base band signal processing block BB#2, and an overload is generated to the base band signal processing block, where stable operation cannot be guaranteed.

(b) Channel Allocation Example when Weight Value is Used (Present Invention)

To solve conventional problems, a weight value according to the processing load is defined for each channel, and when a new channel is accommodated, the total weight of all channels accommodated is calculated, and the new traffic channel is allocated to the base band signal processing block where the total weight is the smallest. By this, channels can be allocated so that the processing load is distributed evenly to each base band signal processing block.

The prerequisites are

① the number of disposed based band signal processing blocks is 3, which are denoted with BB#1–BB#3, ② the maximum number of channels that can be accommodated per base band signal processing block is 10 channels when converted to 9.6 kbps traffic channels, ③ the weight value of each control channel is pilot channel=1, sync channel=1, paging channel=2, and access channel =2 when the 9.6 kbps traffic channel is 1, and ④ The control channels have been allocated to each base band signal processing block BB#1–BB#3, as shown in Table 2.

TABLE 2

| BB #1 | BB #2 | BB #3 |
|---|---|---|
| Pilot #1 | Paging #1 | Pilot #2 |
| Sync #1 | Paging #2 | Sync #2 |
|  | Paging #3 | Pilot #3 |
|  | Access #1 | Sync #3 |
|  | Access #2 | Access #3 |

In other words, the total number of allocated control channels of each block is BB#1=2, BB#2=5 and BB#3=5. To accommodate six new traffic channels in this state, the channels are allocated to each base band signal processing block so that the total weight of each base band signal processing block is even. The current total weight of each signal base band signal processing block BB#1–BB#3 when the maximum number of channels that can be accommodated is 10 is BB#1=2/10, BB#2=10/10 and BB#3=6/10. By allocating a traffic channel to a base band signal processing block having the lowest total weight from among the base band signal processing block BB#1~BB#3, 5 channels are allocated to BB#1 and 1 channel is allocated to BB#3. As a result, BB#1=7/10, BB#2=10/10 and BB#3=7/10. In this way, according to the present invention, channels can be allocated such that the processing capability of each base band signal processing block is not exceeded, and the load is distributed evenly to each base band signal processing block. The above is a case when traffic channels are allocated, but the case when control channels are allocated is the same.

(D) Processing to Set Control Channels to Sectors (a) Processing Flow

Figure 2:
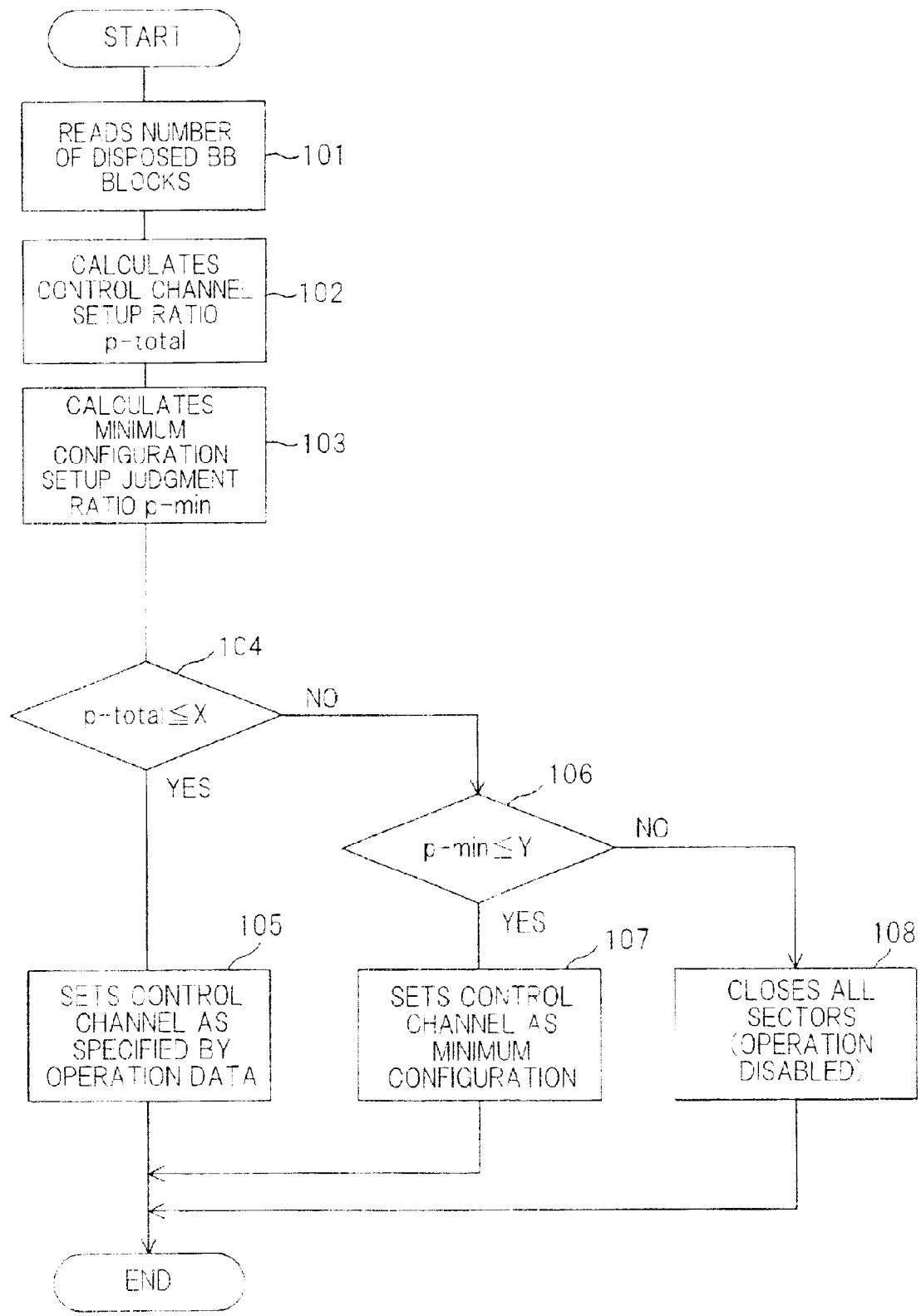
FIG. 2 is a setup processing flow of the control channels to the sectors.

FIG. 2 is a setup processing flow of control channels to sectors, where the weight values in conformity with the processing load have been defined in advance for the traffic channels and each control channels. The ratios X [%] and Y [%] have been set in advance by the operation and maintenance block 14 based on the BTS operation data.

The control block (channel allocation control block) 25 reads the number of base band signal processing blocks disposed in the base station transceiver sub-system 11 from the station operation data (Step 101), and calculates the ratio (control channel setting ratio) p-total between the processing capability, converted to a weight value, of all the base band signal processing blocks and the processing load, converted to a weight value, of control channels set in all sectors (Step 102). Then the control block 25 calculates the ratio (minimum configuration setup judgment ratio) p-min between the processing capability, converted to a weight value, of all base band signal processing blocks, and the processing load, converted to a weight value, of all the control channels with a minimum configuration which are set in the respective sector (Step 103).

Then the control channel setup ratio p-total and the setup ratio X are compared (Step 104), and if p-total $\leq$ X, then the load required for processing all the control channels is small with respect to the processing capability of all the base band signal processing blocks. Therefore it is judged that the control channels can be allocated to each sector as specified by the station operation data (Step 105).

If p-total >X in Step 104, on the other hand, then the load required for processing all the control channels is large with respect to the processing capability of all the base band signal processing blocks. And therefore it is judged that the control channels cannot be allocated to each sector as specified by the station operation data. In such a case, the minimum configuration setup judgment ratio p-min and the setup ratio Y are compared (Step 106), and it is judged whether the control channels with a minimum configuration can be set to each sector.

In other words, if p-min $\leq$ Y, then the load required for processing all the control channels with a minimum configuration is small with respect to the processing capability of all the base band signal processing blocks. Therefore it is judged that the control channels with a minimum configuration can be allocated to each sector. That is, control channels with a minimum configuration are allocated to each sector (Step 107) However, if p-min >Y, then the load required for processing all the control channels with a minimum configuration is large with respect to the processing capability of all the base band signal processing blocks. Therefore it is judged that the control channels with a minimum configuration cannot be allocated to each sector, and all the sectors are closed without transmitting power to all the sectors (Step 108).

(b) Example of Processing to Set Control Channels to Sectors (1) Weighting of Channels Each channel which is used for the base station transceiver sub-system BTS is weighted in advance. Table 3 is the weighting list of each channel, and these values are set based on BTS operation data.

TABLE 3

Channel weighting list

| Channel type | Weight value |
| --- | --- |
| Pilot Channel | w-pilot |
| Sync Channel | w-sync |
| Paging Channel | w-page |
| Access Channel | w-access |
| Traffic Channel (9.6 kbsp) (Fundamental Channel) | w-fch96 |
| Traffic Channel (19.2 kbps) (Supplemental Channel) | w-sch192 |
| Traffic Channel (38.4 kbps) (Supplemental Channel) | w-sch384 |
| Traffic Channel (76.8 kbps) (Supplemental Channel) | w-sch768 |

TABLE 3-continued

Channel weighting list

| Channel type | Weight value |
| --- | --- |
| Traffic Channel (153.6 kbsp) (Supplemental Channel) | w-sch1536 |

(2) Minimum Configuration Judgment Ratio of Control Channel

X [%] is the ratio to judge whether the control channels are set to each sector as specified by the BTS station operation data, or are set to each sector with the minimum configuration (Pilot, Sync, Paging, Access, one channel each), and Y [%] is the ratio to judge whether the transmission of radio waves begins when the control channels are set with the minimum configuration. By X and Y, the minimum operation configuration at setting the control channels of the base station transceiver sub-system BTS is decided. The values of X and Y have been set by the operation and maintenance block 14 as the BTS operation data.

(3) How to Allocate Control Channels to Each Sector

Weight Calculation

At the initial setup of control channels (when the sector operation begins), the total weight w-total of all the disposed base band signal processing blocks is calculated assuming that the weight value of 9.6 kbps traffic channels is w-fch 96. Here 25 traffic channels at 9.6 kbps are supported per base band signal processing block. Also the total weight w-cnt of all the sectors when all the control channels specified by the station operation data are setup, and the ratio p-total of the value w-cnt, with respect to the total weights w-total of all the disposed base band signal processing blocks, are calculated.

$w$-total=$w$-$fch$96×25$ch$×(number of disposed base band signal processing blocks)

$w$-cnt=$\Sigma$($w$-pilot+$w$-sync+$w$-page×(number of paging channels specified by operation data)+$w$-access×(number of access channels specified by operation data))

$p$-total=[$w$-cnt/$w$-total]×100 [%]

Setting Control Channels

The control setup ratio p-total and the setup ratio X are compared, and if p-total $\leq$ X, then it is judged that the control channels specified by the station operation data can be set to each sector. As a result, the processing of the control channels specified by the station operation data is allocated to the base band signal processing blocks. This allocation is executed as specified by the operation data according to the sequence shown in Table 4.

TABLE 4

Sequence of allocating control channels to base band signal processing blocks

| | Pilot CH | Sync CH | Paging CH | Access CH |
| --- | --- | --- | --- | --- |
| Sector A | ① | ② | ④ | ⑦ |
| Sector B | ② | | ⑤ | ⑧ |
| Sector C | ③ | | ⑥ | ⑨ |

When a base band signal processing block specified by the station operation data is not disposed or when the specified base band signal processing block is in failure, the control channels cannot be allocated to the base band signal processing blocks as specified by the station operation data. In such a case, the control channels are allocated as specified by the station operation data in the sequence shown in Table 4, and after allocation processing ends, the later mentioned dynamic channel allocation method is executed so as to allocate non-allocated control channels to a predetermined base band signal processing block.

If p-total >X, on the other hand, it is judged that the number of control channels specified by the station operation data cannot be set, and then it is judged whether the control channels can be set to each sector with a minimum configuration.

The total weights w-min with the minimum configuration of the control channels, and the ratio p-min of this value with respect to the total weight w-total of all the disposed base band signal processing blocks are calculated by the following formulas.

$$w\text{-min}=(w\text{-pilot}+w\text{-sync}+w\text{-page}+w\text{-access})\times 3 \text{ (number of sectors)}$$

$$p\text{-min}=[w\text{-min}/w\text{-total}]\times 100\ [\%]$$

Now the minimum configuration setup judgment ratio p-min and the setup ratio Y are compared, and if p-min $\leq$ Y, it is judged that setup with the minimum configuration is possible, and control channels with a minimum configuration are used for operation. Allocation of the control channels to the base band signal processing blocks is then executed with the minimum configuration according to the sequence shown in Table 4.

If p-min >Y, however, it is judged that setup of control channels with the minimum configuration is also not possible, so radio wave transmission is stopped, and all the sectors are closed.

(E) How to Allocate Base Band Signal Processing Blocks Dynamically

Figure 3:
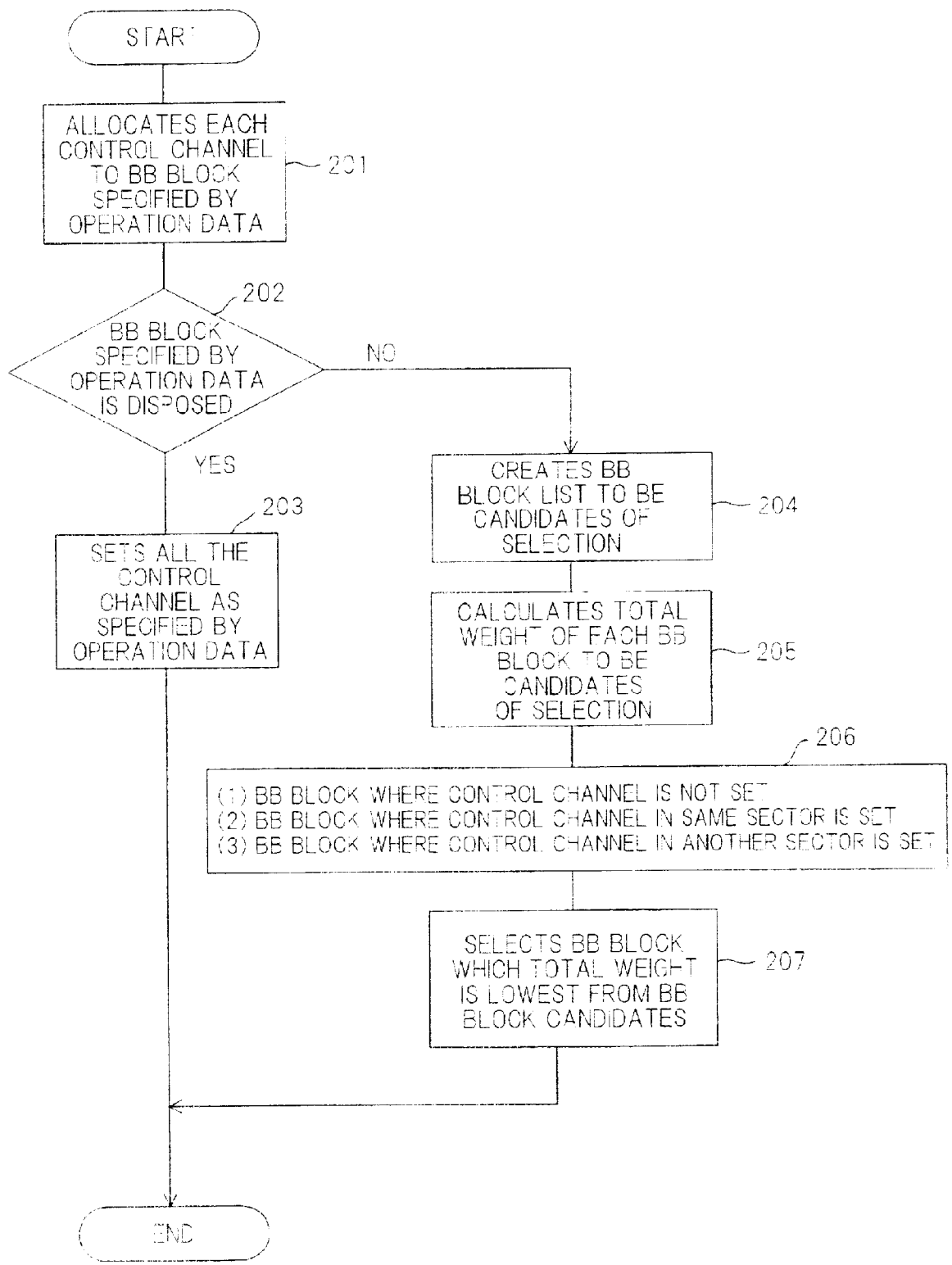
FIG. 3 is a dynamic allocation processing flow of the base band signal processing blocks.

FIG. 3 is a processing flow to allocate the base band signal processing blocks dynamically.

Each control channel is allocated to each base band signal processing block as specified by the station operation data according to the sequence shown in Table 4 (Step 201). At this allocation, it is checked whether the base band signal processing blocks specified by the station operation data are all disposed in the base station transceiver sub-system 11 (Step 202), and if all the base band signal processing blocks are disposed, it is judged that the control channels are set in the base band signal processing blocks as specified by the station operation data (Step 203).

If at least one base band signal processing block specified by the station operation data is not disposed in the base station transceiver sub-system in Step 202, on the other hand, a selection candidate list to reallocate the control channels (referred to as "reallocation target control channel"), which are allocated to the base band signal processing blocks which are not disposed (reallocation target control channels), is created (Step 204). All the base band signal processing blocks which are disposed becomes selection candidates. Then, for each candidate, the total weight of all the allocated channels (processing load), or the ratio between this total weights and the processing capability of the base band signal processing blocks, is calculated (Step 205).

Then the base band signal processing blocks are selected in the following sequence ①–③. This selection sequence is:

① A base band signal processing block where a control channel is not set,

② a base band signal processing block, where the control channels of a sector which are the same as the sector where reallocation target control channels are set, is set, ③ a base band signal processing block, where the control channels of a sector which are different from the sector where reallocation target control channels are set, are set (Step 206).

Out of the base band signal processing blocks, selected by step 206 a base band signal where total weights or the ratio of the total weights and the processing capability of the base band signal processing block is the smallest is finally selected, and the reallocation target control channel is allocated to this base band signal processing block (Step 207).

(F) How to Allocate Traffic Channel to Base Band Signal Processing Block

Figure 4:
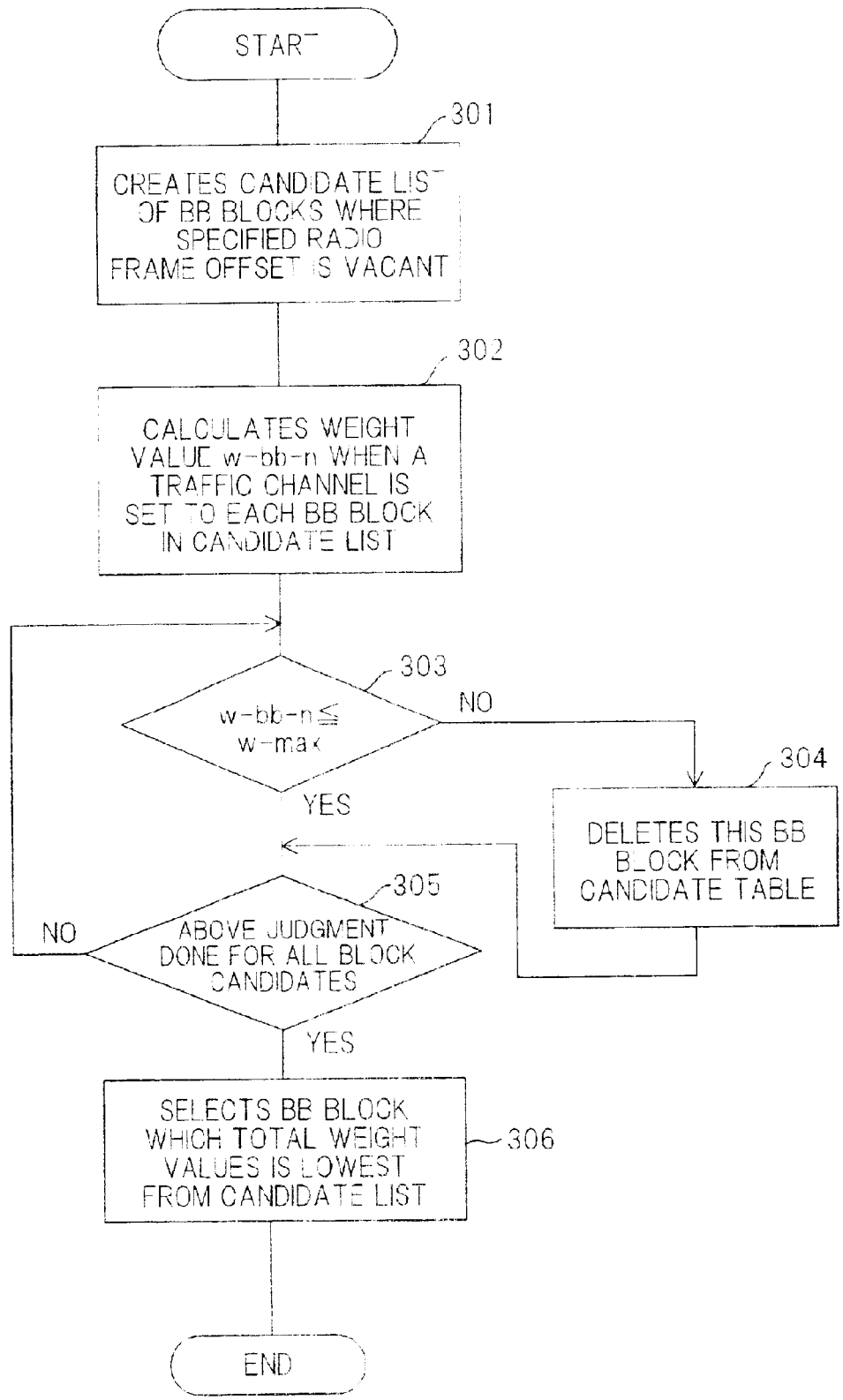
FIG. 4 is an allocation processing flow of a traffic channel.
Figure 5:
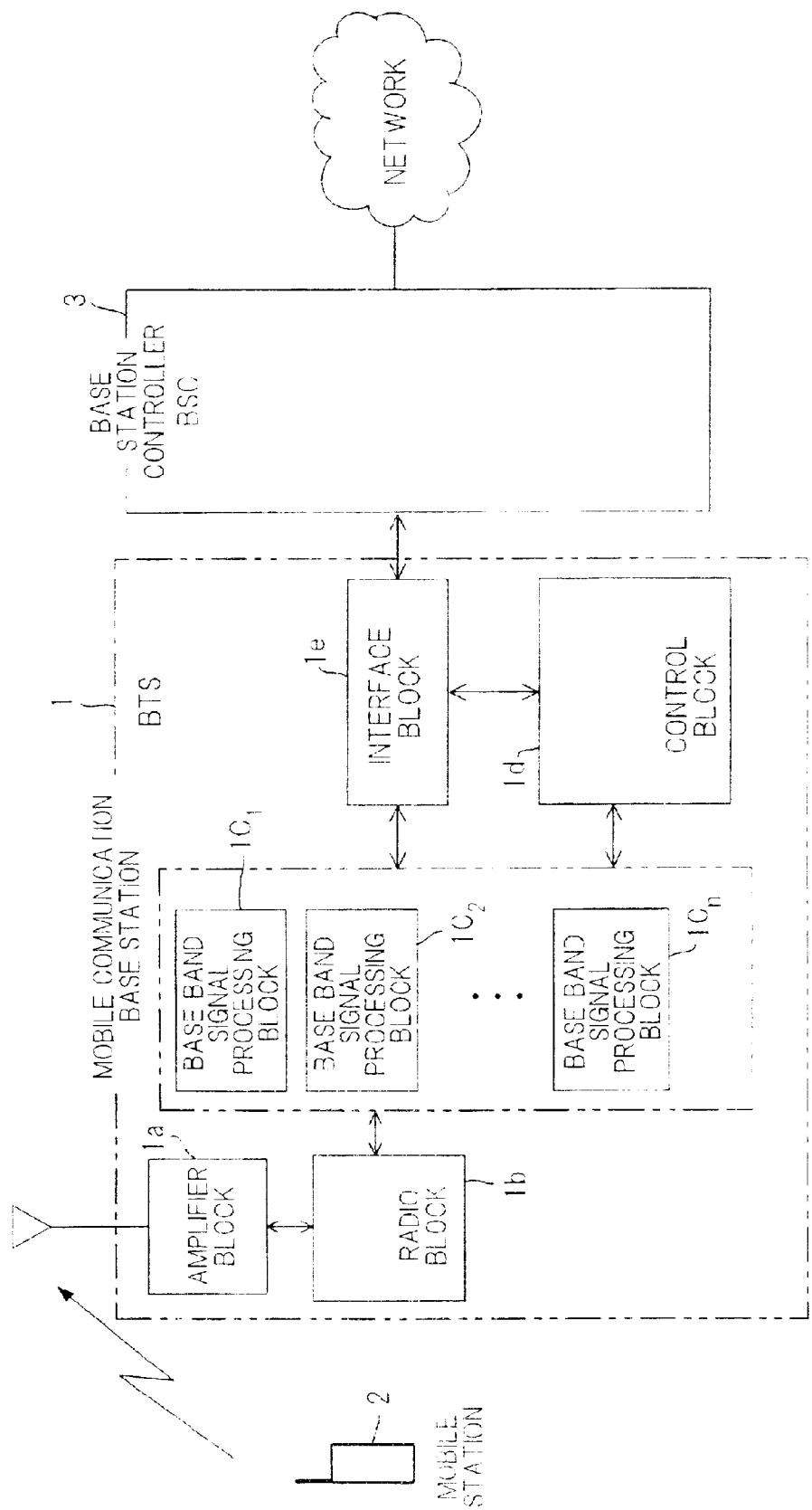
FIG. 5 is a block diagram of the entire mobile radio system, including a conventional radio base station transceiver sub-system.

FIG. 4 is an allocation processing flow of a traffic channel.

When an allocation of a new traffic channel is requested by call control or hand off control, the control block 25 creates a candidate list of the base band signal processing blocks where the specified radio frame offset is vacant (Step 301). Then the total weight (load) w-bb-0~w-bb-n of all the allocated channels when a traffic channel is set is calculated for each base band signal processing block BB#0~BB#n of the candidate list (Step 302).

When the calculation of the total weight w-bb-0~w-bb-n of the allocated channel is completed for each base band signal processing block, it is checked whether each total weight w-bb-0~w-bb-n exceeds the maximum processing capability w-max of the base band signal processing block (Step 303), and if the total weight exceeds, this base band signal processing block is deleted from the candidate table (Step 304).

Then it is checked whether the judgment processing in Step 303 has completed for all the base band signal processing blocks of the candidate list (Step 305), and if not completed, processing after Step 303 is continued. If the judgment processing in Step 303 is completed for all the base band signal processing blocks, the base band signal processing block where the total weight is the smallest is selected from the candidate list, and the requested traffic channel is allocated to this base band signal processing block (Step 306).

The above is the case when the base band signal processing block where the total weight is the smallest is selected, but when the maximum processing capability is different depending on the base band signal processing block, the ratio of the total weight w-bb-0~w-bb-n and the maximum processing capability w-max$_0$~w-max$_n$ of the base band signal processing blocks can be used instead of the total weight w-bb-0~w-bb-n. In other words, the ratio of the total weight w-bb-0~w-bb-n and the maximum processing capability w-max$_0$~w-max$_n$ is calculated in Step 302 in advance, a base band signal processing block where this ratio is the smallest is selected in Step 306, and the traffic channel is allocated to this base band signal processing block.

The above is the case when a traffic channel is allocated, but a control channel can be allocated in the same way.

(G) Example of Setting Channel Allocation (G-1) Prerequisites of Control Channel Allocation The following is a processing example at control channel allocation, and if the weight value (w-fch96) of a 9.6 kbps traffic channel (Fundamental Channel) is 1, then the weight value of each control channel is as shown in Table 5. Here it is assumed that one base band signal processing block has a processing capability to accommodate a maximum of 25 channels of 9.6 kbps traffic channels, and the maximum number of base band signal processing blocks to be disposed is 10.

TABLE 5

Example of control channel weight values

| Channel type | Weight value |
| --- | --- |
| Pilot Channel | w-pilot = 1 |
| Sync Channel | w-sync = 1 |
| Paging Channel | w-page = 3 |
| Access Channel | w-access = 2 |

It is also assumed that the ratios X [%] and Y [%] are set by the BTS station operation data respectively, and the initial allocation data of a control channel is also set by the BTS station operation data, as shown in Table 6.

TABLE 6

Example of allocation setting to base band signal processing block at initial setting of control channel

| Channel type | Sector No. | Number of allocated channels | Allocated base band signal processing block No. |
| --- | --- | --- | --- |
| Pilot Channel | Sector A | 1 | BB #0 |
| | Sector B | 1 | BB #1 |
| | Sector C | 1 | BB #2 |
| Sync Channel | Sector A | 1 | BB #0 |
| | Sector B | 1 | BB #1 |
| | Sector C | 1 | BB #2 |
| Paging Channel | Sector A | 3 | BB #0 |
| | Sector B | 3 | BB #1 |
| | Sector C | 3 | BB #2 |
| Access Channel | Sector A | 3 | BB #3 |
| | Sector B | 3 | BB #4 |
| | Sector C | 3 | BB #5 |

For the above case, an example of control channel allocation, depending on the number of base band signal processing blocks disposed, will be described.

(G-2) Executing Initial Allocation of Control Channels with Disposed Base Band Signal Processing Blocks—5 Units (BB#0~BB#4)

(G-2-1) Deciding Control Channels to be Set for Sectors

Control channel setup ratio p-total [%] and minimum configuration setup judgment ratio p-min [%] are calculated respectively, then p-total and p-min are compared with the ratios X and Y, which are set in the operation data.

(1) Initially p-total [%] is Calculated According to the following formula.

$$p\text{-total}=wt/w$$

$wt$=(total weights of control channels specified by operation data)

$W$=(total weights of all base band signal processing blocks disposed)

$$Wt = \left(w\text{-}pilot + w\text{-}sync + (w\text{-}page \times 3) + (w\text{-}access \times 3)\right) \times$$
$$(\text{number of sectors})$$
$$= (1 + 1 + 9 + 6) \times 3$$
$$= 51$$

$$W = 5 \times 25 = 125$$

$$p\text{-total}=wt/w=51/125=51/125=41\ [\%]$$

(2) p-min [%] is calculated according to the following formula.

$$p\text{-min}=Wm/W$$

$Wm$=(total weights of minimum configuration control channels)

$W$=(total weights of all the base band signal processing blocks disposed)

$$Wm = \left(w\text{-}pilot + w\text{-}sync + w\text{-}page + w\text{-}access\right) \times$$
$$(\text{number of sectors})$$
$$= (1 + 1 + 3 + 2) \times 3$$
$$= 21$$

$$W = 5 \times 25 = 125$$

$$p\text{-min}=Wm/W=21/125=17\ [\%]$$

(3) After this, p-total and p-min are Compared with X and Y

① When the ratios X and Y, which are set in the station operation data, are X=50 [%] and Y=30 [%] respectively, judgment whether the control channels can be set in the sectors as specified by the station operation data depends on the comparison result of p-total and X. Since p-total (41%) ≤X (50%), the control channels can be set to the sectors as specified by the station operation data.

② When the ratios X and Y being set by the station operation data are X=40 [%] and Y=30 [%] respectively, judgment whether the control channels can be set as specified by the station operation data depends on the comparison result of p-total and X. Since p-total (41%)>X (40%), the control channels cannot be set to the sectors as specified by the station operation data. So whether the control panels as a minimum configuration can be set to the sectors is determined by the comparison result of p-min and Y. Since p-min (17%)≤Y (30%), the control channels can be set to all the sectors as the minimum configuration.

③ When the ratios X and Y, which are set in the station operation data, are X=40 [%] and Y=15 [%] respectively, judgment whether the control channels can be set to the sectors as specified by the station operation data depends on the comparison result of p-total and X. Since p-total (41%)>X (40%), the control channels cannot be set to the sectors as specified by the station operation data. So whether the control channels can be set to the sectors with a minimum configuration is determined by the comparison result of p-min and Y. Since p-min (17%)>Y (15%), the control channels cannot be set with aminimum configuration, and in such a case, all the sectors are closed. In other words, radio waves are not transmitted, so the operation service of the base station transceiver sub-system BTS is disabled.

(G-2-2) Processing to Set Control Channels to Base Band Signal Processing Blocks When it is possible to set the control channels to the sectors as specified by the station operation data described in ① of (G-2-1), the processing to allocate the control channels to the base band signal processing blocks is as follows.

① Based on the station operation data (Table 6), the number of the base band signal processing block to which the control channel of each sector is allocated is selected. Since there are five base band signal processing blocks disposed, BB#0, BB#1, BB#2, BB#3 and BB#4 (BB#5 is not disposed), processing is as follows.

For the pilot channel, the setting is as specified by the operation data, that is,
For sector A (1ch): BB#0
For sector B (1ch): BB#1
For sector C (1ch): BB#2

For the sync channel, the setting is as specified by the operation data, that is,
For sector A (1ch): BB#0
For sector B (1ch): BB#1
For sector C (1ch): BB#2

For the paging channel, the setting is as specified by the operation data, that is,
For sector A (3ch): BB#0
For sector B (3ch): BB#1
For sector C (3ch): BB#2

For the access channel, the setting is as specified by the operation data, that is,
For sector A (3ch): BB#3
For sector B (3ch): BB#4

For the access channel for sector C, the base band signal processing block BB#5, specified by the station operation data, is not disposed (unavailable), so the three access channels to be set to the sector C are allocated to the base band signal processing blocks from BB#0–BB#4, using a dynamic channel allocation method.

② Dynamic Control Channel Allocation Method

Since the base band signal processing block specified by the station data is not disposed in the above ①, access channels (for sector C) which cannot be set as specified by the station operation data are reallocated to the base band signal processing blocks as follows.

A base band signal processing block which satisfies the three conditions (a)–(c) sequentially from condition (a) becomes a choice.

(a) A base band signal processing block where a control channel is not set,
(b) a base band signal processing block where a control channel in the same sector is set,
(c) a base band signal processing block where a control channel in another sector is set.

There is no base band signal processing block which satisfies condition (a). This is because a control channel has been set for all the disposed base band signal processing blocks BB#0–BB#4.

Since condition (b) is satisfied, BB#2 becomes a candidate. This is because Pilot CH, Sync CH and Paging CH of the sector C are allocated to BB#2.

Since condition (c) is satisfied, BB#0, BB#1, BB#3 and BB#4 become candidates.

The total weight when an access channel (3 ch) is set is now calculated for all the base band signal processing block choices, and a base band signal processing block for which the total weight is the smallest is selected. Table 7 shows the result of calculating the total weight.

TABLE 7

| Base band signal processing block No. | Total weight values (including Access Ch for sector C) | | |
|---|---|---|---|
| BB#0 | (1 + 1 + 3 × 3 + 2 × 3)/25 | = 17/25 | = 68 [%] |
| BB#1 | (1 + 1 + 3 × 3 + 2 × 3)/25 | = 17/25 | = 68 [%] |
| BB#2 | (1 + 1 + 3 × 3 + 2 × 3)/25 | = 17/25 | = 68 [%] |
| BB#3 | (2 × 3 + 2 × 3)/25 | = 12/25 | = 48 [%] |
| BB#4 | (2 × 3 + 2 × 3)/25 | = 12/25 | = 48 [%] |

Based on the total weight of each base band signal processing block, the earliest number BB#3 is selected out of the base band signal processing blocks BB#3 and BB#4, for which the total weight is low.

(G-3) Executing Initial Allocation of Control Channels with Disposed Base Band Signal Processing Blocks=7 Units (BB#0–BB#6)

(G-3-1) Deciding Control Channels to be Set for Sectors

The control channel setup ratio p-total [%] and the minimum configuration setup judgment ratio p-min [%] are calculated respectively, then p-total and p-min are compared with the ratios X and Y, which are set in the operation data.

(1) Initially p-total [%] is calculated according to the following formula.

$p\text{-total}=Wt/W$ $Wt$=(total weights of control channels specified by operation data)

$W$=(total weights of all base band signal processing blocks disposed)

$$Wt = (w\text{-}pilot + w\text{-}sync + (w\text{-}page) \times 3) + (w\text{-}access) \times 3)) \times$$
$$(\text{number of sectors})$$
$$= (1 + 1 + 9 + 6) \times 3$$
$$= 51$$

$W=7 \times 25=175$ $p\text{-total}=Wt/W=51/175=29\ [\%]$ (2) p-min [%] is calculated according to the following formula.

$p\text{-min}=Wm/W$ $Wm$=(total weights of minimum configuration control channels)

$W$=(total weights of all the base band signal processing blocks disposed)

$$Wm = (w\text{-}pilot + w\text{-}sync + w\text{-}page + w\text{-}access) \times$$
$$(\text{number of sectors})$$
$$= (1 + 1 + 3 + 2) \times 3$$
$$= 21$$

$W=7 \times 25=175$ $p\text{-min}=Wm/W=21/175=12\ [\%]$ (3) After this, p-total and p-min are compared with X and Y.

When the ratios X and Y, which are set in the station operation data, are X=50 [%] and Y=30 [%] respectively, judgment whether the control channels can be set to the sectors as specified by the station operation data depends on the comparison result of p-total and X. Since p-total (29%) ≦X (50%), the control channels can be set to the sectors as specified by the station operation data.

(G-3-2) Processing to Set Control Channels to Base Band Signal Processing Blocks When it is possible to set the control channels as specified by the station operation data described in (G-3-1), processing to allocate the control channels to the base band signal processing blocks is as follows.

Based on the station operation data (Table 6), the number of the base band signal processing block to which the control channels of each sector are allocated is selected. Since there are seven base band signal processing blocks disposed, BB#0, BB#1, BB#2, BB#3, BB#4, BB#5 and BB#6, processing is as follows.

For the pilot channel, the setting is as specified by the operation data, that is,
For sector A (1ch): BB#0
For sector B (1ch): BB#1
For sector C (1ch): BB#2

For the sync channel, the setting is as specified by the operation data, that is,
For sector A (1ch): BB#1
For sector B (1ch): BB#1
For sector C (1ch): BB#2

For the paging channel, the setting is as specified by the operation data, that is,
For sector A (3ch): BB#0
For sector B (3ch): BB#1
For sector C (3ch): BB#2

For the access channel, the setting is as specified by the operation data, that is,
For sector A (3ch): BB#3
For sector B (3ch): BB#4
For sector C (3ch): BB#5

All the control channels can be allocated to the base band signal processing blocks as specified by the station operation data.

(G-4) Executing Initial Allocation of Control Channels with Disposed Base Band Signal Processing Blocks=3 Units (BB#0–BB#2)

(G-4-1) Deciding Control Channels to be Set for Sectors

The control channel setup ratio p-total [%] and the minimum configuration setup judgment ratio p-min [%] are calculated respectively, then p-total and p-min are compared with the ratios X and Y, which are set in the operation data.

(1) Initially p-total [%] is calculated according to the following formula.

$$p\text{-total} = Wt/W$$

$Wt$=(total weights of control channels specified by operation data)

$W$=(total weights of all base band signal processing blocks disposed)

$$Wt = (w\text{-}pilot + w\text{-}sync + (w\text{-}page) \times 3 + (w\text{-}access) \times 3) \times$$
$$(\text{number of sectors})$$
$$= (1 + 1 + 9 + 6) \times 3$$
$$= 51$$

$$W = 3 \times 25 = 75$$

$$p\text{-total} = Wt/W = 51/75 = 68\ [\%]$$

(2) p-min [%] is calculated according to the following formula.

$$p\text{-min} = Wm/W$$

$Wm$=(total weights of minimum configuration control channels)

$W$=(total weights of all the base band signal processing blocks disposed)

$$Wm = (w\text{-}pilot + w\text{-}sync + w\text{-}page + w\text{-}access) \times$$
$$(\text{number of sectors})$$
$$= (1 + 1 + 3 + 2) \times 3$$
$$= 21$$

$$W = 3 \times 25 = 75$$

$$p\text{-min} = Wm/W = 21/75 = 28\ [\%]$$

(3) After this, p-total and p-min are compared with X and Y.

When the ratios X and Y, which are set in the station operation data, are X=50 [%] and Y=30 [%] respectively, judgment whether the control channels can be set to the sectors as specified by the station operation data depends on the comparison result of p-total and X.

Since p-total (68%)>X (50%), the control channels cannot be set to the sectors as specified by the station operation data. So whether the control channels can be set to the sectors as a minimum configuration is determined by the comparison result of p-min and Y. Since p-min (28%)≦Y (30%), the control channels are set to all the sectors as the minimum configuration.

(G-4-2) Processing to Set Control Channels to Base Band Signal Processing Blocks Processing to allocate the control channels with the minimum configuration to the base band signal processing blocks is as follows. Here the minimum configuration of the control channels is specified in the station operation data.

① Based on the minimum configuration, the number of the base band signal processing block to which the control channel of each sector is allocated is selected. Since the disposed base band signal processing blocks are BB#0, BB#1 and BB#2, processing is as follows.

For the pilot channel, the setting is specified as follows,
For sector A (1ch): BB#0
For sector B (1ch): BB#1
For sector C (1ch): BB#2

For the sync channel, the setting is specified as follows,
For sector A (1ch): BB#0
For sector B (1ch): BB#1
For sector C (1ch): BB#2

For the paging channel, the setting is specified as follows,
For sector A (1ch): BB#0
For sector B (1ch): BB#1
For sector C (1ch): BB#2

For the access channel, the access channels for all the sectors are reallocated to one of the base band signal processing blocks BB#0–BB#2 using a dynamic channel allocation method, since the base band signal processing blocks BB#3, BB#4 and BB#5, specified by the station operation data (minimum configuration data), are not disposed for all the sectors A, B and C.

② Dynamic Control Channel Allocation Method

Since the base band signal processing block BB#3 specified by the station operation data (minimum configuration data) in the above ① is not disposed, access channels which cannot be set as specified by the station operation data are reallocated to the base band signal processing blocks as follows.

A base band signal processing block which satisfies three conditions (a)–(c) sequentially from condition (a) becomes a candidate.

(a) A base band signal processing block where a control channel is not set,
(b) a base band signal processing block where a control channel in the same sector is set, (c) a base band signal processing block where a control channel in another sector is set.

There is no base band signal processing block which satisfies condition (a). This means that a control channel has been set for all the disposed base band signal processing blocks BB#0–BB#2.

For both conditions (b) and (c), the total weights of the base band signal processing blocks BB#0–BB#2, including access channels, are the same values. Therefore the access channel (1ch) for sector A is set to the base band signal processing block BB#0, the access channel (1ch) for section B is set to the base band signal processing block BB#1, and the access channel (1ch) for sector C is set to the base band signal processing block BB#2.

According to the present invention, it is correctly judged whether it is necessary to decrease the number of control channels to be set when the number of base band signal processing blocks disposed is small, or when the number of available base band signal processing blocks decreases due to a system failure, so as to set an appropriate number of control channels in each sector.

Also according to the present invention, it is possible to simply allocate the control channels to each sector and to allocate the processing of the control channels to each base band signal processing block if it is unnecessary to decrease the number of control channels.

Also according to the present invention, if it is necessary to decrease the number of control channels, it is correctly judged whether it is possible to set the control channels with a minimum configuration to each sector, and if possible, the processing of the control channels with a minimum configuration can be allocated to the base band signal processing blocks, and if impossible, all the sectors can be closed.

Also according to the present invention, it is possible to reallocate the control channels which have been allocated to a base band signal processing block which is not disposed, or which cannot be used due to a failure to each available base band signal processing block, so as not to exceed the processing capability thereof, and so as to distribute the load, when the number of base band signal processing blocks disposed is low, or when the number of available base band signal processing blocks is low due to a system failure.

Also according to the present invention, it is possible to dynamically allocate a new traffic channel and a control channel to the base band signal processing blocks considering the processing load of each channel, so that the load of each base band signal processing block is accurately distributed, and allocating channels exceeding the processing capability is prevented, and the loss probability can be decreased.

Also according to the present invention, it is possible to prevent an overload status of a specific base band signal processing block by evenly allocating channels to a plurality of operating base band signal processing blocks for each base band signal processing block. Also by evenly distributing the processing load of each base band signal processing block, the operation of the base band signal processing blocks can be more stable. Also by distributing the accommodation of the control channels required for service operation to a plurality of base band signal processing blocks, a system shutdown during the failure of a base band signal processing block can be minimized. Also when the number of disposed base band signal processing blocks is low, and when control channels cannot be allocated as specified by the station operation data which has been set, operation can be continued without stopping service as a radio base station by changing the configuration of the control channels to a minimum configuration.

As many apparently widely different embodiments of the present invention can be made without departing from the spirit and scope thereof, it is to be understood that the invention is not limited to the specific embodiments thereof, except as defined in the appended claims.

What is claimed is:

1. A radio base station transceiver sub-system which communicates with a mobile station by radio, comprising:

a radio block which is disposed for each service area, and receives radio signals from the mobile station and transmits radio signals to the mobile station;

base band signal processing blocks which perform base band signal processing respectively for a plurality of channels;

a channel allocation control block which decides the number of the control channels to be allocated to each service area based on the processing capability of the base band signal processing blocks, the number of the base band signal processing blocks and the processing load of the control channels; and control channel specification means of specifying the control channels to be allocated to each service area using station operation data, wherein when a weight value in conformity with the processing load is defined for each control channel, said channel allocation control block judges whether it is possible to allocate the control channels specified by said station operation data to each service area based on the processing capability, concerted to a weight value, of all the base band signal processing blocks and the processing load, converted to a weight value, of all the control channels allocated to the service area using said station operation data, and if possible, the processing of said control channel is allocated to each base station signal processing block in accordance with said station operation data.

2. The radio base station transceiver sub-system according to claim 1, wherein if it is impossible to allocate the control channels specified by said station operation data to each service area, said channel allocation control block judges where it is possible to allocate control channels with a minimum configuration to each service area based on said processing capability, converted to a weight value, of all the available base band signal processing blocks and the processing load, converted to a weight value, of all the control channels with a minimum configuration to be allocated to the respective service area, and if possible, processing of control channels with a minimum configuration is allocated to each base band signal processing block.

3. The radio base station transceiver sub-system according to claim 2, wherein if it is impossible to allocate the control channels with a minimum configuration to each service area, all the service areas are set to a closed state.

4. The radio base station transceiver sub-system according to claim 1, wherein said control channel specification means allocates the execution of the processing of each specified control channel to each base band signal processing block, and said channel allocation control block controls the base band signal processing blocks to execute the processing of each control channel in accordance with said allocation.

5. The radio base station transceiver sub-station according to claim 1, wherein said channel allocation control block calculates, for each base band signal processing block the processing load, converted to a weight value, of all the channels allocated thereto, or the ratio of said processing load and the processing capability, converted to a weight value, of the base band signal processing block; and if processing is impossible in a base band signal processing block because it is not disposed or cannot be used due to a failure, the processing of the control channels allocated to said base band signal processing block is allocated to another base band signal processing block where said processing load or said ratio is small.

6. A radio base station transceiver sub-system which communicates with a mobile station by radio, comprising:

a radio block which is disposed for each service area, and receives radio signals from the mobile station and transmits radio signals to the mobile station;

base band signal processing blocks which perform base band signal processing respectively for a plurality of channels; and a channel allocation control block which allocates control channels and traffic channels to each base band signal processing block, wherein when said channel allocation control block allocates traffic channels or control channels to a base band signal processing block, said channel allocation control block defines a weight value for the traffic channels and control channels respectively in accordance with the processing load, calculates, for each base band signal processing block the processing load, converted to a weight value, of all the channels allocated thereto, or the ratio of said processing load and the processing capability, converted to a weight value, of the base band signal processing block, and allocates the traffic channel or control channel to a base band signal processing block where said processing load or said ratio is small.

7. The radio base station transceiver sub-system according to claim 6, wherein said channel allocation control block defines the weight value of the traffic channel in conformity with the transmission rate, and allocates the traffic channel to the base band signal processing blocks such that the processing capability of said base band signal processing block is not exceeded.

* * * * *